(12) United States Patent
Wengler et al.

(10) Patent No.: US 7,859,461 B2
(45) Date of Patent: *Dec. 28, 2010

(54) METHOD FOR DETECTING NAVIGATION BEACON SIGNALS USING TWO ANTENNAS OR EQUIVALENT THEREOF

(75) Inventors: Michael James Wengler, Carlsbad, CA (US); Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 12/098,323

(22) Filed: Apr. 4, 2008

(65) Prior Publication Data
US 2008/0186230 A1   Aug. 7, 2008

Related U.S. Application Data

(63) Continuation of application No. 11/165,281, filed on Jun. 22, 2005, now Pat. No. 7,362,268.

(51) Int. Cl.
*G01S 3/16* (2006.01)
(52) U.S. Cl. ...................................... 342/378; 342/383
(58) Field of Classification Search ................ 342/378, 342/382, 383, 434
See application file for complete search history.

(56) References Cited

U.S. PATENT DOCUMENTS

| | | | |
|---|---|---|---|
| 4,387,373 A | 6/1983 | Longuemare, Jr. | |
| 4,546,355 A | 10/1985 | Boles | |
| 4,794,395 A | 12/1988 | Cindrich et al. | |
| 4,978,961 A | 12/1990 | Williams et al. | |
| 7,362,268 B2* | 4/2008 | Wengler et al. | 342/378 |
| 7,519,395 B2* | 4/2009 | Mesecher et al. | 455/561 |
| 2005/0277442 A1 | 12/2005 | Mesecher et al. | |

* cited by examiner

*Primary Examiner*—Dao L Phan
(74) *Attorney, Agent, or Firm*—Andrea L. Mays; Arnold J. Gum

(57) ABSTRACT

A method for detecting a plurality of navigation beacon signals by using either two antennas or a synthetic aperture antenna for receiving a plurality of distinct measurements, and combining the plurality of distinct measurements using a plurality of antenna weight components to form an interference cancellation beam. In one embodiment, the plurality of antenna weight components is determined by eigenvalue processing. In another embodiment, the plurality of antenna weight components is determined by simplified processing. In another aspect, a single antenna is used for receiving an originally received measurement. A copy of the originally received measurement is made and processed to achieve the proper time delay to emulate spatial diversity. The originally received measurement and the processed copy are combined to form an interference cancellation beam.

20 Claims, 12 Drawing Sheets

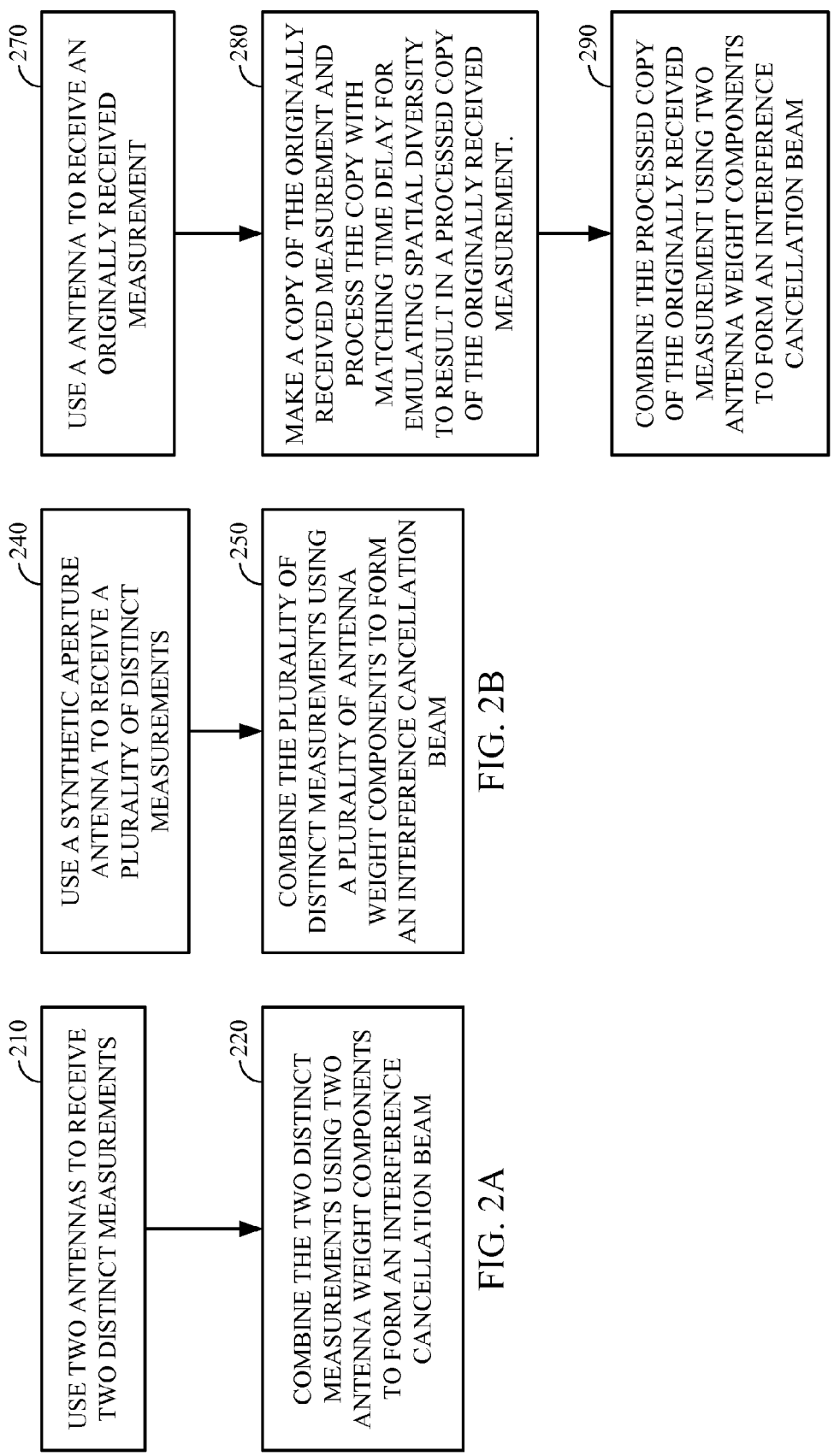

METHOD FOR DETECTING NAVIGATION BEACON SIGNALS USING TWO ANTENNAS OR EQUIVALENT THEREOF

RELATED APPLICATIONS

This application is a continuation of U.S. patent application Ser. No. 11/165,281, filed Jun. 22, 2005, entitled "METHOD FOR DETECTING NAVIGATION BEACON SIGNALS USING TWO ANTENNAS OR EQUIVALENT THEREOF," which claims the benefit of U.S. Provisional Application No. 60/680,454 filed May 11, 2005, which is assigned to the assignee hereof and which is expressly incorporated herein by reference.

FIELD

This invention relates generally to methods for location determination.

BACKGROUND

In range-based location determination systems, time delay measurements of navigation beacon signals from a plurality of sources are converted to range information associated with the source of each navigation beacon signal. Ranges to different sources with known locations are combined to solve for the unknown user location via geometric techniques known, for example, as trilateration or multilateration. If the delay of navigation beacon signals cannot be known absolutely (e.g. in systems where the user clock is not synchronized to the network), location determination algorithms may treat user clock temporal bias as another unknown, to be solved for by the trilateration process, using an additional time delay measurement.

To improve position determination accuracy, receiving multiple navigation beacon signals (i.e., signal sources) is desirable. However, in many cases, weaker beacon signals (i.e., those farther away from the user receiver) are not detectable (and therefore not usable) since they are masked by stronger navigation beacon signals.

In an attempt to capture the weaker navigation beacon signals, previous techniques use a single antenna per user receiver. Detection of the weaker navigation beacon signals is attempted by using increased signal integration times to increase the sensitivity of the weaker navigation beacon signals.

Accordingly, it is desirable to provide a method for detecting navigation beacon signals with the use of two antennas or its equivalent thereof.

SUMMARY

Disclosed is a method for detecting navigation beacon signals with the use of two antennas or its equivalent thereof.

According to one aspect, a method for detecting a plurality of navigation beacon signals comprising: using two antennas for receiving two distinct measurements, and combining the two distinct measurements using two antenna weight components to form an interference cancellation beam. In one embodiment, the two antenna weight components are determined by eigenvalue processing. In another embodiment, the two antenna weight components are determined by simplified processing.

According to another aspect, a method for detecting a plurality of navigation beacon signals comprising: using a synthetic aperture antenna for receiving a plurality of distinct measurements, and combining the plurality of distinct measurements using a plurality of antenna weight components to form an interference cancellation beam. In one embodiment, the plurality of antenna weight components is determined by eigenvalue processing. In another embodiment, the plurality of antenna weight components is determined by simplified processing.

According to one aspect, a method for detecting a plurality of navigation beacon signals comprising: using a antenna for receiving an originally received measurement, making a copy of the originally received measurement and processing the copy of the originally received measurement by matching time delay for emulating spatial diversity to result in a processed copy of the originally received measurement, and combining the originally received measurement with the processed copy of the originally received measurement using two antenna weight components to form an interference cancellation beam. In one embodiment, the two antenna weight components are determined by eigenvalue processing. In another embodiment, the two antenna weight components are determined by simplified processing.

It is understood that other embodiments will become readily apparent to those skilled in the art from the following detailed description, wherein it is shown and described various embodiments by way of illustration. The drawings and detailed description are to be regarded as illustrative in nature and not as restrictive.

BRIEF DESCRIPTION OF THE DRAWINGS

FIGS. 2a, 2b and 2c are flow diagrams of algorithms for detecting a plurality of navigation beacon signals.

DETAILED DESCRIPTION

Figure 1A:
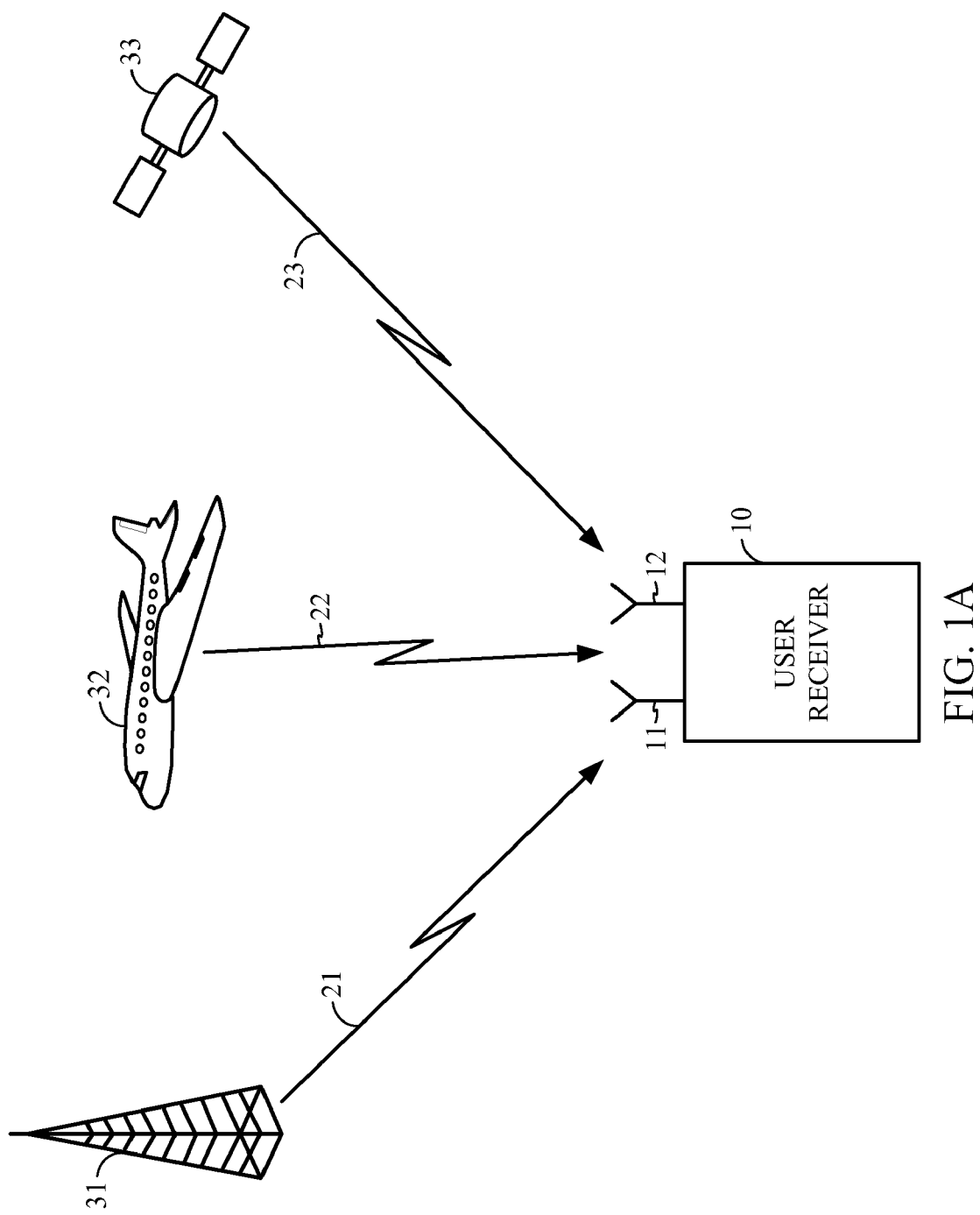
FIGS. 1a, 1b and 1c illustrate systems for detecting a plurality of navigation beacon signals.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The present invention discloses a method for detecting navigation beacon signals with the use of two antennas or its equivalent thereof. Using two antennas provides a form of spatial diversity for receiving two distinct measurements of the surrounding radio environment. Spatial diversity allows improved sensitivity in receiving more navigation beacon signals to improve position accuracy and reliability. The two distinct measurements are processed at the user receiver to enhance the detectability of weaker navigation beacon signals by alternate forms of interference cancellation (IC) algorithm. Two embodiments of the interference cancellation algorithm are disclosed herein: eigenvalue processing and simplified processing. Although only two embodiments of interference cancellation algorithm are disclosed herein, one skilled in the art would know that other embodiments of the interference cancellation algorithm may be used within the scope of the present invention.

One skilled in the art would know that to achieve spatial diversity, two physical antennas are not always necessary. A single antenna which captures its received measurements at different times as though they were two distinct measurements received by two separate antennas at the same time is known as a synthetic aperture antenna. A synthetic aperture antenna could be used with the interference cancellation algorithm for detecting navigation beacon signals that may be masked by stronger navigation beacon signals.

Also, a form of virtual spatial diversity is achieved with successive cancellation using one physical antenna. The receiver contains in its memory a copy of the strongest received navigation beacon signal. This memory serves as a second virtual antenna, one that sees only the strongest navigation beacon signal with no noise or interference or presence of other weaker navigation beacon signals. This copy in memory can be subtracted with appropriately calculated antenna weight components from the originally received measurement. One skilled in the art would understand that the second strongest navigation beacon signal, the third strongest navigation beacon signal and so on can be cancelled in this similar manner to arrive at a navigation beacon signal with the desired level of sensitivity.

Figure 1B:
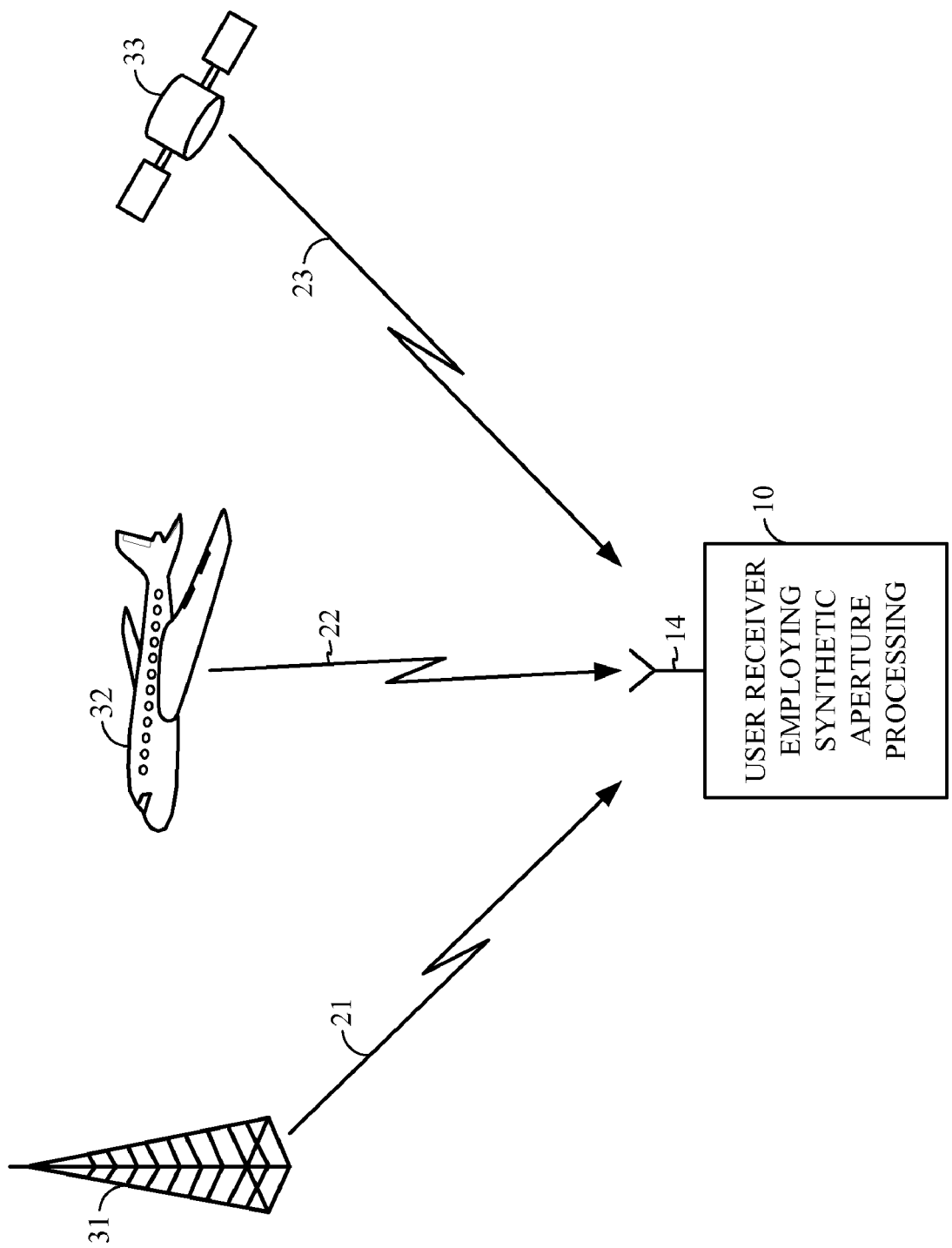
Figure 1C:
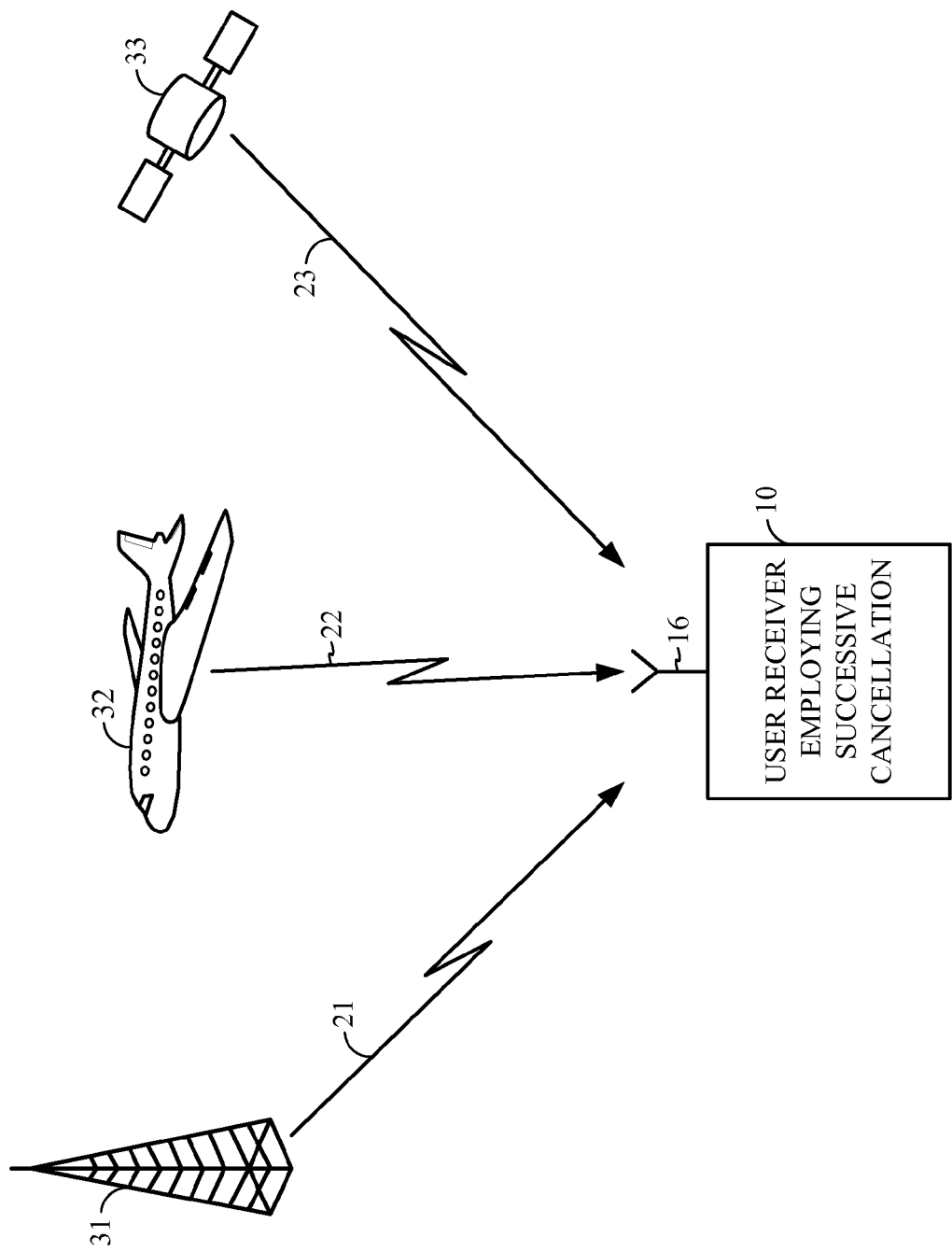

FIGS. 1a, 1b and 1c illustrate systems for detecting a plurality of navigation beacon signals. Multiple signal sources 31, 32, 33 (including terrestrial, airborne and/or space sources) transmit navigation beacon signals 21, 22, 23 to a user receiver 10. In FIG. 1a, the user receiver 10 includes two physical antennas 11, 12 for receiving the navigation beacon signals. In FIG. 1b, a synthetic aperture antenna 14 replaces the two physical antennas shown in FIG. 1a. In FIG. 1c, a single physical antenna 16 using successive cancellation replaces the two physical antennas shown in FIG. 1a.

FIGS. 2a, 2b and 2c are flow diagrams of algorithms for detecting a plurality of navigation beacon signals. As illustrated in FIG. 2a, step 210, two antennas are used for receiving two distinct measurements. In step 220, the two distinct measurements are combined using two antenna weight components to form an interference cancellation beam. In FIG. 2b, a synthetic aperture antenna is used. In step 240, a synthetic aperture antenna receives a plurality of distinct measurements. In step 250, using a plurality of antenna weight components, the plurality of distinct measurements are combined to form an interference cancellation beam. In FIG. 2c, one antenna is used for detecting navigation beacon signals. In step 270, one antenna receives an originally received measurement. In step 280, a copy of the originally received measurement is made and processed with matching time delay for emulating spatial diversity to result in a processed copy of the originally received measurement. In step 290, the originally received measurement and the processed copy using two antenna weight components to form an interference cancellation beam.

Figure 3B:
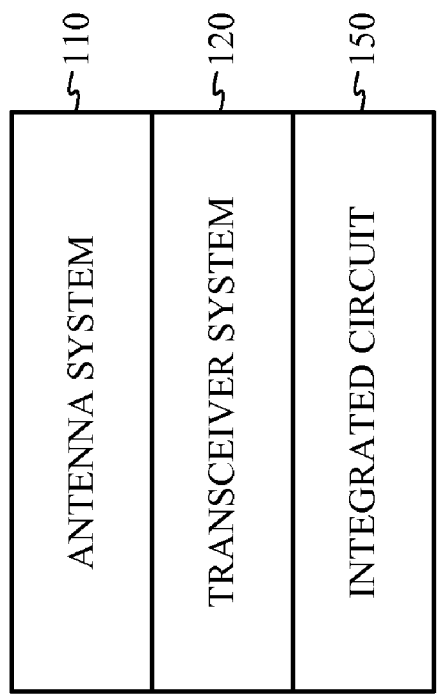
FIGS. 3a and 3b are block diagrams of the user receiver.
Figure 3A:
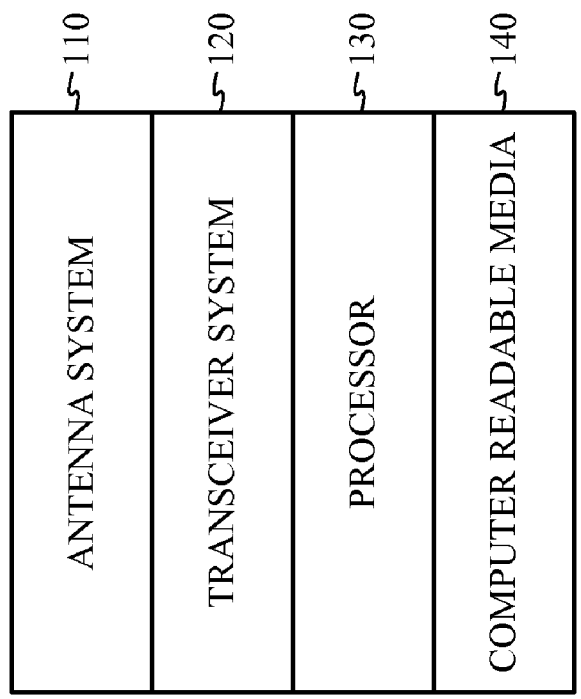

FIGS. 3a and 3b are block diagrams of the user receiver 10. The first embodiment of the user receiver 10 is shown in FIG. 3a which includes a antenna system 110, a transceiver system 120, a processor 130 and a computer readable media 140 all electrically coupled to each other. The antenna system 110 could include two physical antennas, a synthetic aperture antenna or a single antenna employing successive cancellation. FIG. 3b illustrates a second embodiment of the user receiver 10 which includes the antenna system 110 and the transceiver system 120. In addition, an integrated circuit 150 is electrically coupled to the antenna system 110 and the transceiver system 120. One skilled in the art would understand that integrated circuit 150 could be implemented using a processor and memory system, an FPGA (field programmable gate array), an ASIC (application specific integrated circuit) or the equivalent thereof.

In one embodiment, the interference cancellation algorithm uses algebraic eigenvalues to determine the optimal antenna weight components $w_1$ and $w_2$ for interference cancellation ("eigenvalue processing"). The eigenvalue processing is described here for a user system such as a mobile user with two antennas or its equivalent thereof. Consider the complex-correlation between the baseband complex voltages on antenna #1 and antenna #2. The complex-correlation is characterized by a complex valued matrix:

$$\rho(i,j) = \text{sum\_time}\{IQ\text{data}(\text{time},i)'*IQ\text{data}(\text{time},j)\}/N\text{time} \quad (1)$$

where i and j can each take values 1 or 2; where IQdata(time,1) is the time series of complex voltage samples on antenna #1; where IQdata(time,2) is the time series of complex voltage samples on antenna #2; where Ntime is the total number of time samples in the sum; where sum_time is the complex sum over time, and where X' indicates the complex-conjugate of X. $\rho(1,1)$, $\rho(1,2)$, $\rho(2,1)$, and $\rho(2,2)$ taken together define a 2×2 correlation matrix $\rho$.

$\rho$ has two real, positive eigenvalues with two eigenvectors. Consider a "beam-forming" combination of the IQ streams from the two antennas (antenna #1 and antenna #2):

$$IQ\text{dataC}(\text{time}) = w_1 IQ\text{data}(\text{time},1) + w_2 IQ\text{data}(\text{time},2) \quad (2)$$

Then, if $w_1$ and $w_2$ are the components of the orthonormal eigenvectors of $\rho$, the mean energy in IQdataC(time) is at minimum and maximum values under the constraint that $|w_1|^2 + |w_2|^2 = 1$. That is, the minimum energy occurs for $w_1$ and $w_2$ chosen from one eigenvector and the maximum value occurs for $w_1$ and $w_2$ chosen from the other eigenvector.

Describing the linear combination in terms of beam-forming, one eigenvalue gives antenna weight components which point the beam (as much as possible) towards the incoming radio energy, while the other gives an orthogonal beam which points the beam (as much as possible) away from the incoming radio energy. Lower eigenvector refers to the eigenbeam corresponding to the smaller eigenvalue. Upper eigenvector refers to the eigenbeam corresponding to the larger eigenvalue. The upper eigenvector looks very similar to either of the two single antennas (antenna #1 and antenna #2, separately).

Table 1 lists twelve sets of data used to analyze the performance of various algorithms such as Baseline, Interference Cancellation (IC) algorithm (using eigenvalue processing), Search Remaining List of PN Offsets (RE) algorithm and Increased Sensitivity of Pilot Search (IS) algorithm. For the Baseline algorithm, there are 3072 chip coherent integrations with 32 of those incoherently summed for a total of 98304 (3 PN rolls) integrated. The processing software calculates a $10^{-5}$ false alarm level per full search threshold of Ec/Io>−33 dB. (Ec equals energy per chip in joules and Io equals interference noise density in Watts per Hz.) For the IS (Increased Sensitivity of Pilot Search) algorithm, there are 98304 chip coherent integrations with a full Doppler search and no incoherent summing. The processing software calculates a $10^{-5}$ false alarm level per full search threshold of Ec/Io>−37 dB.

TABLE 1

| CHAN | COH | ICOH | Dop. | Source | Features | Used? |
|---|---|---|---|---|---|---|
| 1 | 3072 | 32 | No | Internal Antenna | | Yes |
| 2 | 3072 | 32 | No | Whip Antenna | Baseline/RE | Yes |
| 3 | 3072 | 32 | No | Lower Eigenvector | | Yes |
| 4 | 3072 | 32 | No | Upper Eigenvector | | Yes |
| 5 | 3072 | 64 | No | Incoh. Sum of Eigenvectors | IC/IC+RE | Yes |
| 2 + 3 | 3072 | 32 | No | UNION of channels 2 & 3 | | Yes |
| 6 | 98304 | 1 | Yes | Internal Antenna | | No |
| 7 | 98304 | 1 | Yes | Whip Antenna | IS/IS+RE | Yes |
| 8 | 98304 | 1 | Yes | Lower Eigenvector | | Yes |
| 9 | 98304 | 1 | Yes | Upper Eigenvector | | No |
| 10 | 98304 | 2 | Yes | Incoh. Sum of Eigenvectors | | No |
| 7 + 8 | 98304 | 1 | Yes | UNION of channels 7 & 8 | IC+IS/IC+IS+RE | Yes |

Both of the Baseline and IS integrations are over the same number of chips, 98304, corresponding to 80 ms or 3 PN Rolls of data. Doppler search is required with the long coherent integration so that signals (when the mobile user is moving) can still be decovered. The Signal to Noise Ratio (SNR) improvement for the incoherent versus coherent-doppler search should be theoretically about $\sqrt{32}$ or 7.5 dB. However, because of the different orders of $x^2$ statistics between the coherent and incoherent integrations, the 7.5 dB advantage of coherent integration is decreased to only 4 dB advantage at very low false alarm rates.

The Upper Eigenvector adds the antenna voltage signals in such a way as to maximize the energy of the sum. In contrast, the Lower Eigenvector adds the antenna voltage signals in such a way as to minimize the energy of the sum.

Consider a situation where the mobile user is close to a base station. The base station here is being used as a navigation beacon. The correlation of the signals between the two antennas (antenna #1 and antenna #2) is large, arising from the dominant nearby base station navigation beacon signal received on each antenna. The Upper Eigenvector will tend to beam-form the two antennas (antenna #1 and antenna #2) towards the strong source. The Lower Eigenvector, by contrast, tends to direct a beam null (e.g., beam minimum) towards the strong signal source. The Upper Eigenvector is expected to have marginal benefit since PPMs (Pilot Phase Measurements) from this combination will be very similar to those seen on each individual antenna (antenna #1 and antenna #2, individually). PPMs provide the time-delay measurements of signals from the base station that allow the base station to be used as a navigation beacon in a trilateration system. However, the Lower Eigenvector causes the antenna beam to be formed so as to minimize the dominant nearby base station navigation beacon signal. With this navigation beacon signal partially cancelled out by the optimal combination, weaker navigation beacon signals can be resolved in the searcher, as long as they are not (in a beam-forming sense) in the same direction from the mobile user as the dominant nearby base station navigation beacon signal.

Channels 5 and 10 are formed by incoherently summing (after scaling for equal noise levels) the two eigenvector solutions. This should not enhance the SNRs. However, for a very low false alarm rate, raising the order of the $x^2$ statistics can result in a lower threshold of detection.

Figure 4:
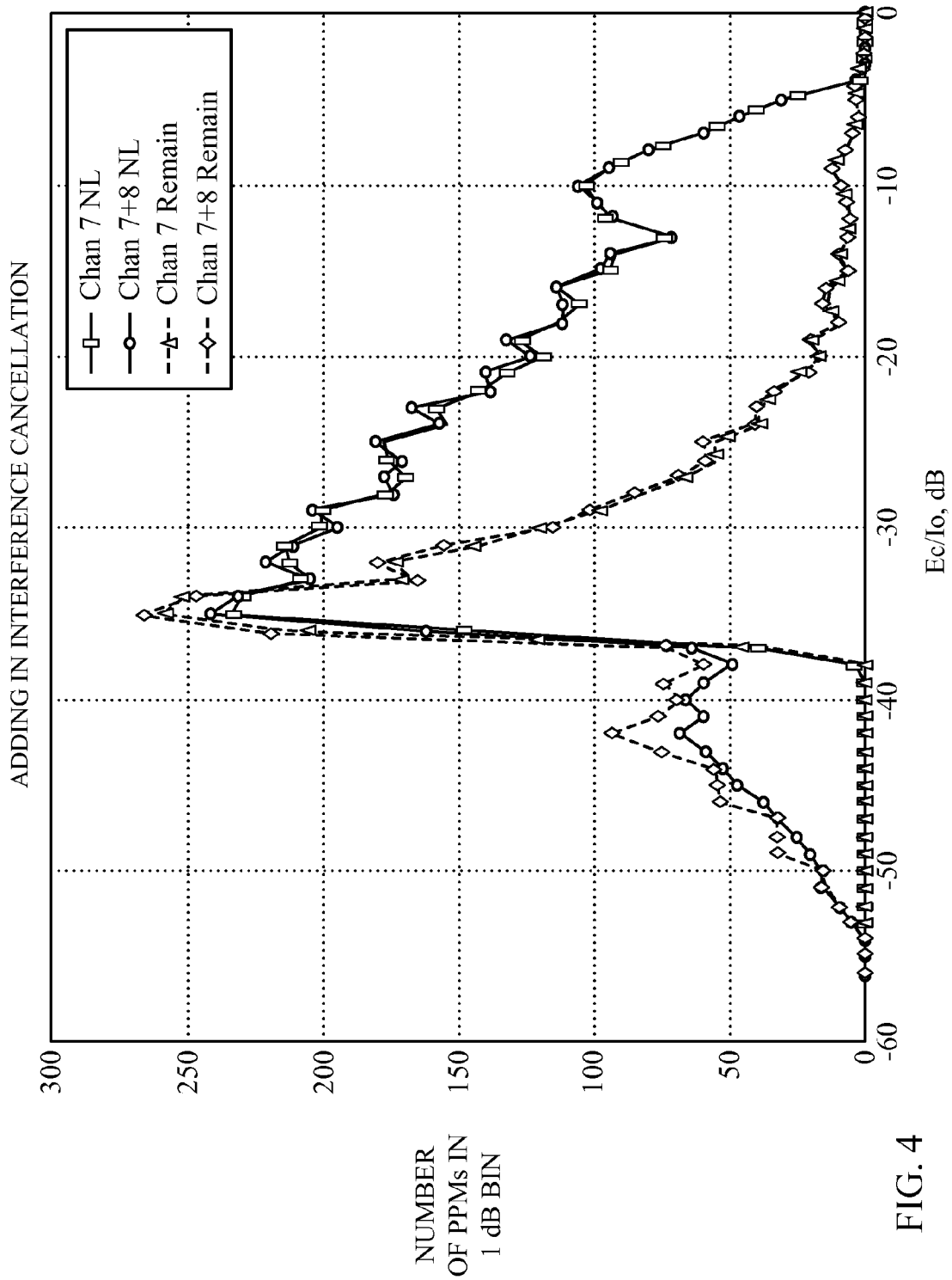
FIG. 4 is a histogram of detected PPMs (Pilot Phase Measurements) for Channels 7 and 8. Channel 7 is the case with a single whip antenna.

FIG. 4 is a histogram of detected PPMs for Channels 7 and 8. Channel 7 is the case with a single whip antenna. Channel 8 ("interference canceling channel") uses the Lower Eigenvector. The single whip antenna of Channel 7 is combined with the interference canceling Lower Eigenvector channel (Channel 8) to create a synthetic channel which contains the union of the PPMs from Channels 7 and 8. When both channels detect a PPM at a particular PN offset, only the PPM with the higher value Ec/Io is kept. The interference canceling channel (Channel 8) effectively has no improvement for Ec/Io>−36 dB. But, below −36 dB, the interference canceling channel adds many hundreds of PPMs. The PPMs added by the interference canceling channel (Channel 8) are about evenly split between the Neighbor List and the Remaining List.

Figure 5:
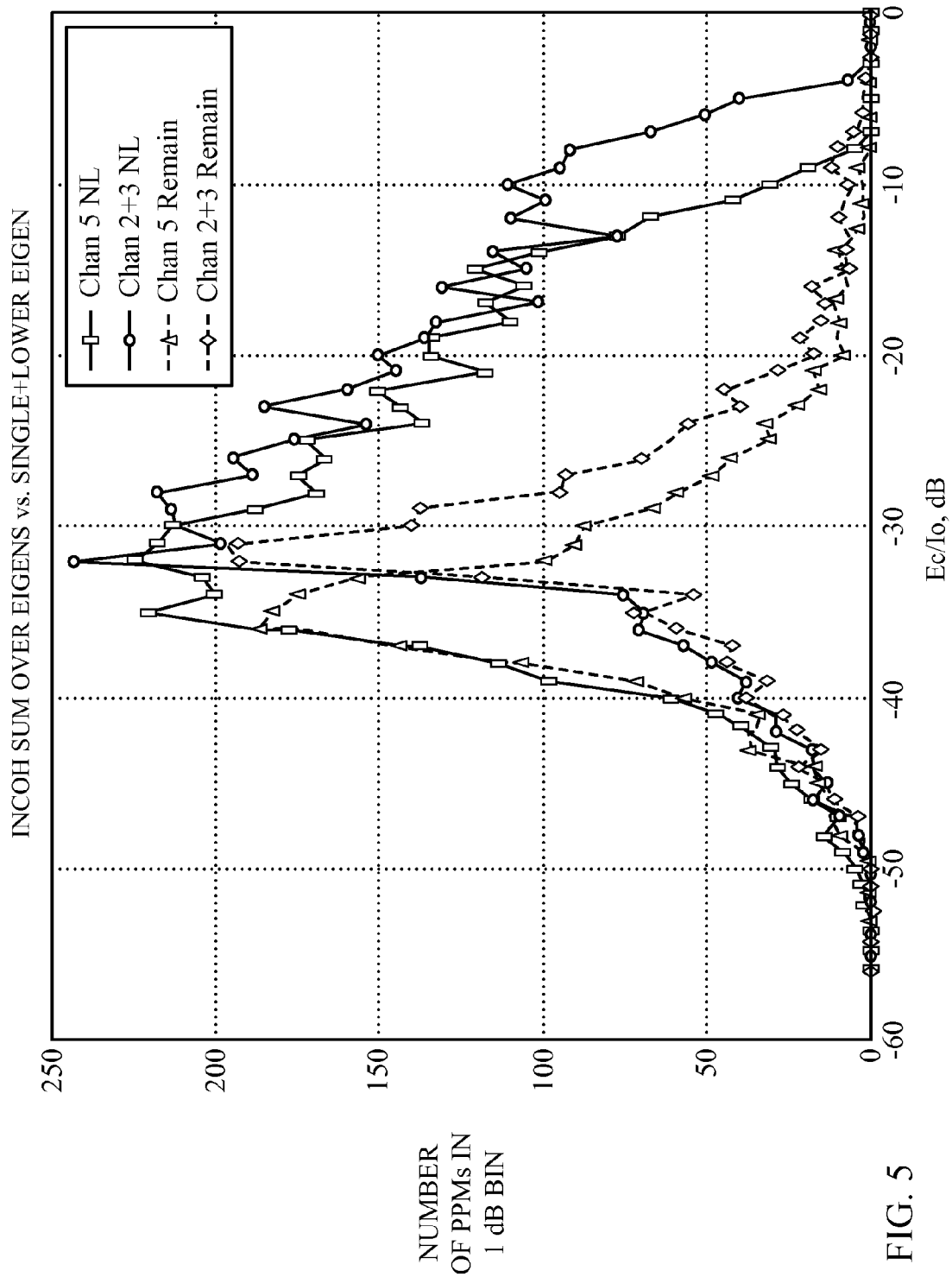
FIG. 5 is a histogram of detected PPMs (Pilot Phase Measurements) for Channels 5 and union set of Channels 2 and 3.

FIG. 5 is a histogram of detected PPMs for Channels 5 and union set of Channels 2 and 3. FIG. 5 compares the incoherent sum over both eigenvectors (Channel 5) with the combination of the single antenna (Channel 2) and the Lower Eigenvector "interference canceling" eigenvector (Channel 3). In forming the incoherent sum over both eigenvectors (Channel 5), the strongest Ec/Io values are shifted down but the PPMs are still included. As such, it is not visibly obvious from FIG. 5 how to derive the optimum combination of the various channels. Table 2 summarizes the total number of PPMs for each channel, including the synthetic sum channels. Table 2 shows that there is virtually no difference in the number of PPMs between the incoherent sum over both eigenvectors (Channel 5) and the combination of the single antenna (Channel 2) and the Lower Eigenvector "interference canceling" eigenvector (Channel 3). In example shown in Table 2, adding the Remaining List of Channel 2 increases the number of PPMs by 38%.

TABLE 2

| | | Number of PPMs | | |
|---|---|---|---|---|
| | Chan | Total | in NL | Remain | Rem/NL |
| INCOH | 1 | 5102 | 3824 | 1278 | 33% |
| INCOH | 2 | 5122 | 3840 | 1282 | 33% |
| INCOH | 3 | 6146 | 4446 | 1700 | 38% |
| INCOH | 4 | 5107 | 3822 | 1285 | 34% |
| INCOH | 5 | 6505 | 4577 | 1928 | 42% |
| INCOH | 2 + 3 | 6465 | 4574 | 1891 | 41% |
| COH + DOP | 7 | 6401 | 4416 | 1985 | 45% |
| COH + DOP | 8 | 7390 | 4938 | 2452 | 50% |
| COH + DOP | 7 + 8 | 7920 | 5114 | 2806 | 55% |

Table 3 summarizes the improvement of the number of PPMs over Channel 2 (Single Whip Antenna Using Incoherent Summing) for the various channels. As shown in Table 3, using the Neighbor List only with Channel 2 as a Baseline, the improvement of the number of PPMs for Channel 7 (Coherent+Doppler on a single Whip Antenna) is 15%. Neighbor list refers to the list of base stations a cellular phone will look for communication purposes. Remaining list refers to the other base stations the phone would not normally search for. If the Remaining List is included, the improvement is 25%. Also shown in Table 3, using the Neighbor List only with Channel 2 as a Baseline, the improvement of the number of PPMs for Channel 5 (Two Antennas) is 19%. If the Remaining List is included, the improvement is 27%. The results of Channel 5 is the same for the Channels 2+3 case. As shown in Table 3, using the Neighbor List only with Channel 2 as a Baseline, the improvement of the number of PPMs for Channels 7+8 is 33%. If the Remaining List is included, the improvement is 55%.

TABLE 3

| | | Ref to Chan 2 | | |
|---|---|---|---|---|
| | Chan | Total | in NL | Remain |
| INCOH | 1 | 0% | 0% | 0% |
| INCOH | 2 | 0% | 0% | 0% |
| INCOH | 3 | 20% | 16% | 33% |
| INCOH | 4 | 0% | 0% | 0% |
| INCOH | 5 | 27% | 19% | 50% |
| INCOH | 2 + 3 | 26% | 19% | 48% |
| COH+DOP | 7 | 25% | 15% | 55% |
| COH+DOP | 8 | 44% | 29% | 91% |
| COH+DOP | 7 + 8 | 55% | 33% | 119% |

Table 4 summarizes the improvement of the number of PPMs over Channel 7 (Single Whip Antenna with Long Coherent+Doppler Search) for the various channels. As shown in Table 4, using the Neighbor List only and using two antennas (Channels 7+8), the improvement of the number of PPMs is 16%. If the Remaining List is included, the improvement is 24%.

TABLE 4

| | | Ref to Chan 7 | | |
|---|---|---|---|---|
| | Chan | nPPMs | in NL | Remain |
| INCOH | 1 | −20% | −13% | −36% |
| INCOH | 2 | −20% | −13% | −35% |
| INCOH | 3 | −4% | 1% | −14% |
| INCOH | 4 | −20% | −13% | −35% |
| INCOH | 5 | 2% | 4% | −3% |
| INCOH | 2 + 3 | 1% | 4% | −5% |
| COH+DOP | 7 | 0% | 0% | 0% |
| COH+DOP | 8 | 15% | 12% | 24% |
| COH+DOP | 7 + 8 | 24% | 16% | 41% |

Figure 6:
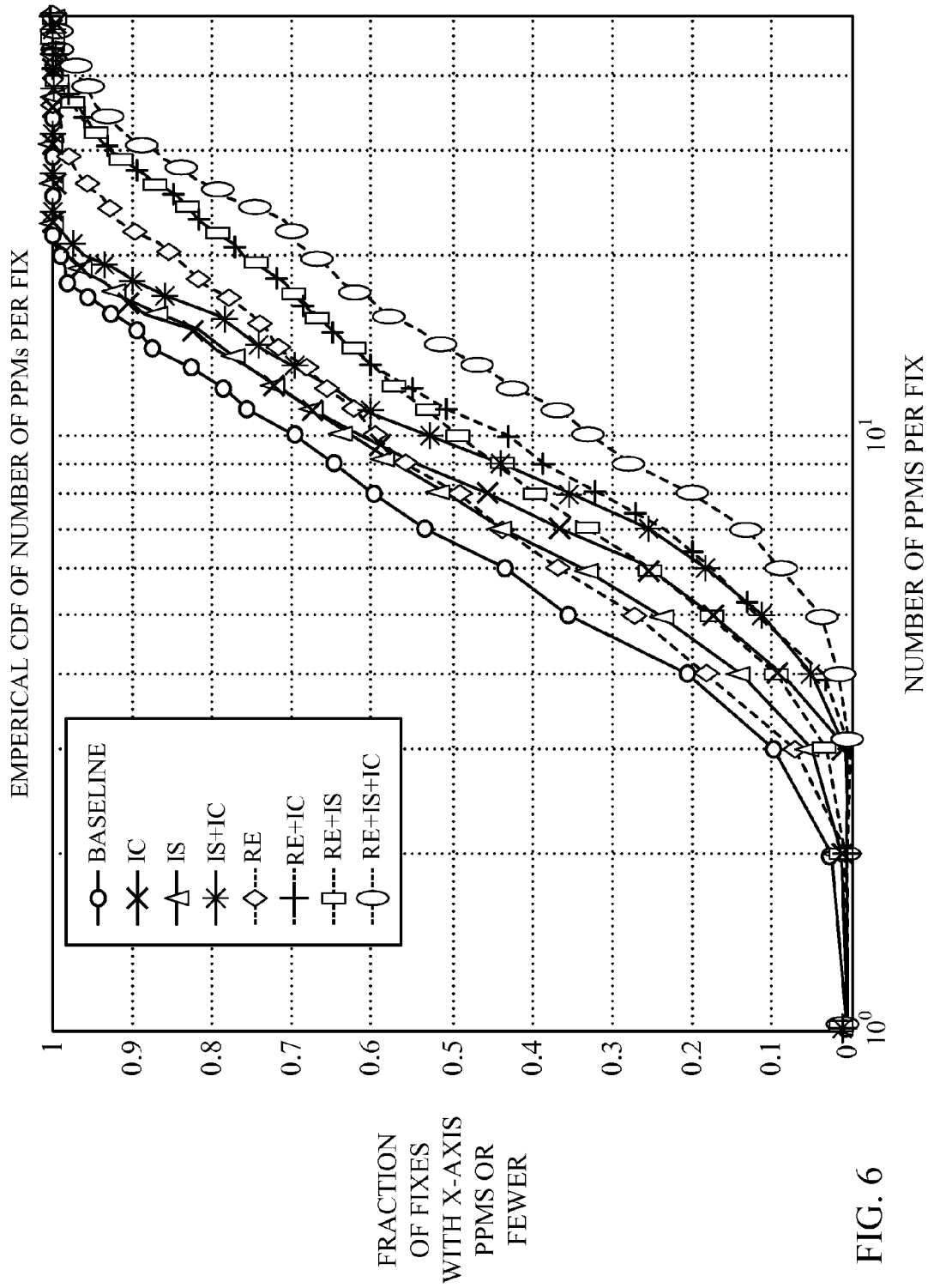
FIG. 6 illustrates the empirical CDF of number of PPMs (Pilot Phase Measurements) per fix for an illustrative subset of channels investigated.

FIG. 6 illustrates the empirical CDF of number of PPMs per fix for an illustrative subset of channels investigated. Table 5 lists the CDF percentile for 4 or fewer PPMs for the same illustrative subset of channels investigated. Table 5 shows that over half of the 20% of fixes that had 4 or fewer PPMs are shifted to more than 4 PPMs using only single antenna features of the RE and the IS algorithms. As shown in Table 5, the IS algorithm alone is about twice as effective as using the RE algorithm alone in detecting more PPMs. And, the IS and the RE algorithms together are better than the sum of each one separately. A noticeable feature from Table 5 is that the 2 antenna interference cancellation (IC) algorithm, by itself, is more effective than either of the other two algorithms (RE or IS) using a single antenna. Also shown in Table 5, the RE algorithm in combination with the IC algorithm adds more improvement than combining the RE algorithm with the IS algorithm. The combination of all three algorithms (IC, RE and IS) yields an overall 93% improvement.

TABLE 5

| CDF percentile for 4 or more PPMs: | | |
|---|---|---|
| Tech | CDF % | Improve, % |
| Baseline | 20.60% | 0% |
| RE | 18.40% | 11% |
| IS | 13.80% | 33% |
| RE+IS | 9.40% | 54% |
| IC | 8.80% | 57% |
| IC+IS | 5.30% | 74% |
| IC+RE | 3.50% | 83% |
| RE+IS+IC | 1.50% | 93% |

Figure 7:
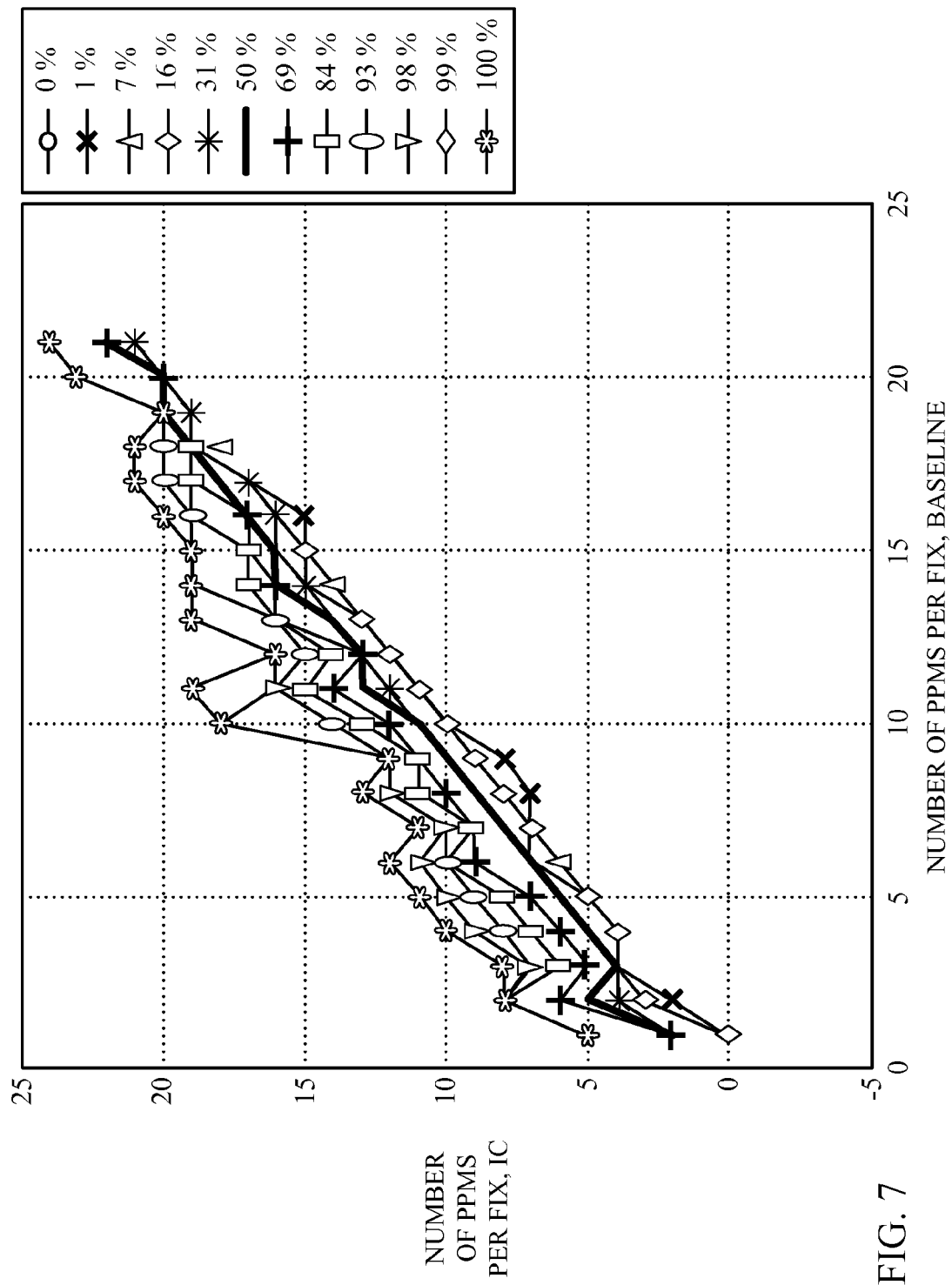
FIGS. 7-10 compare the number of PPMs (Pilot Phase Measurements) per fix for the RE, IS or IC algorithms alone or in various combinations with the number of PPMs per fix in the baseline format.
Figure 8:
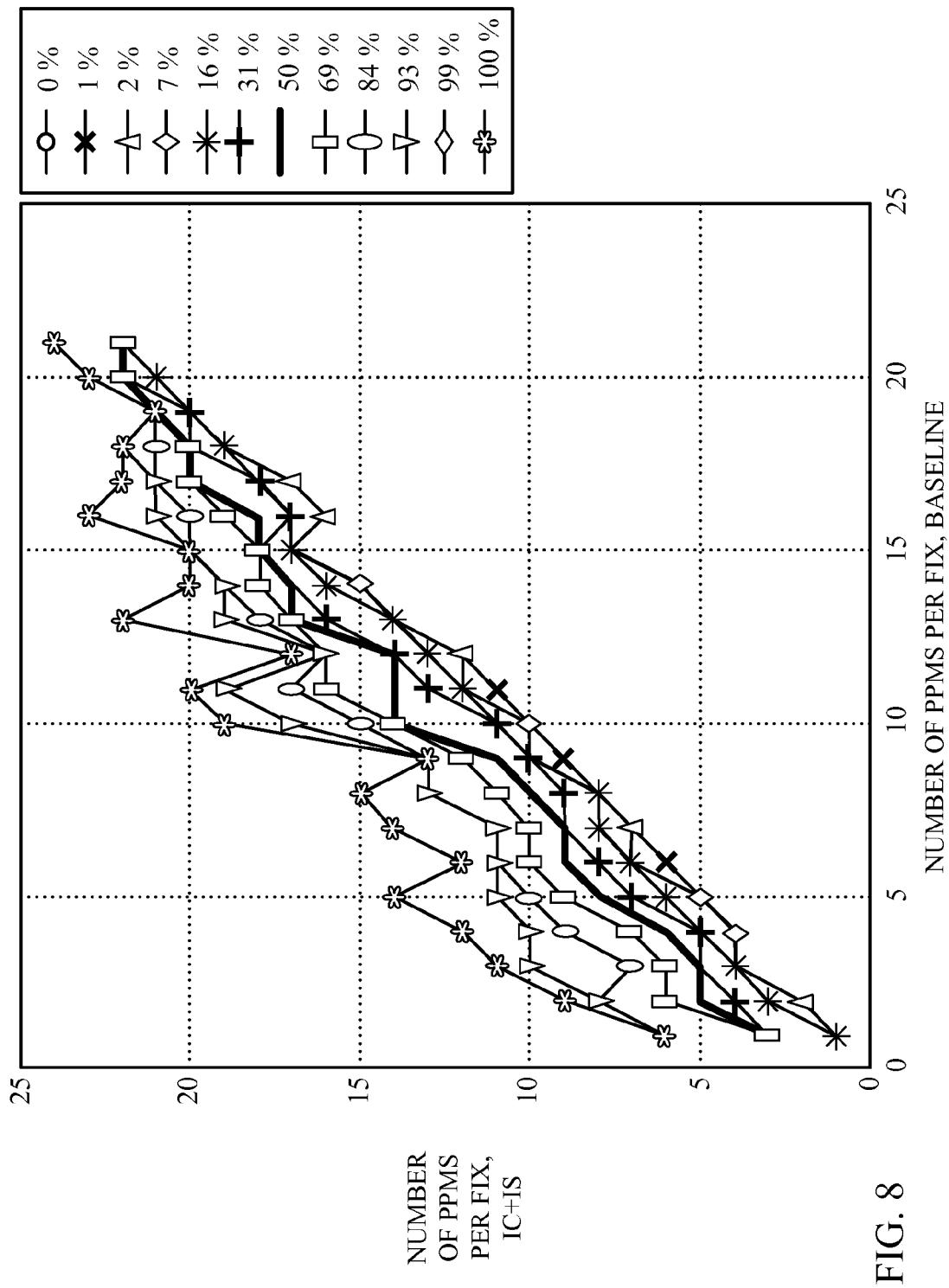
Figure 9:
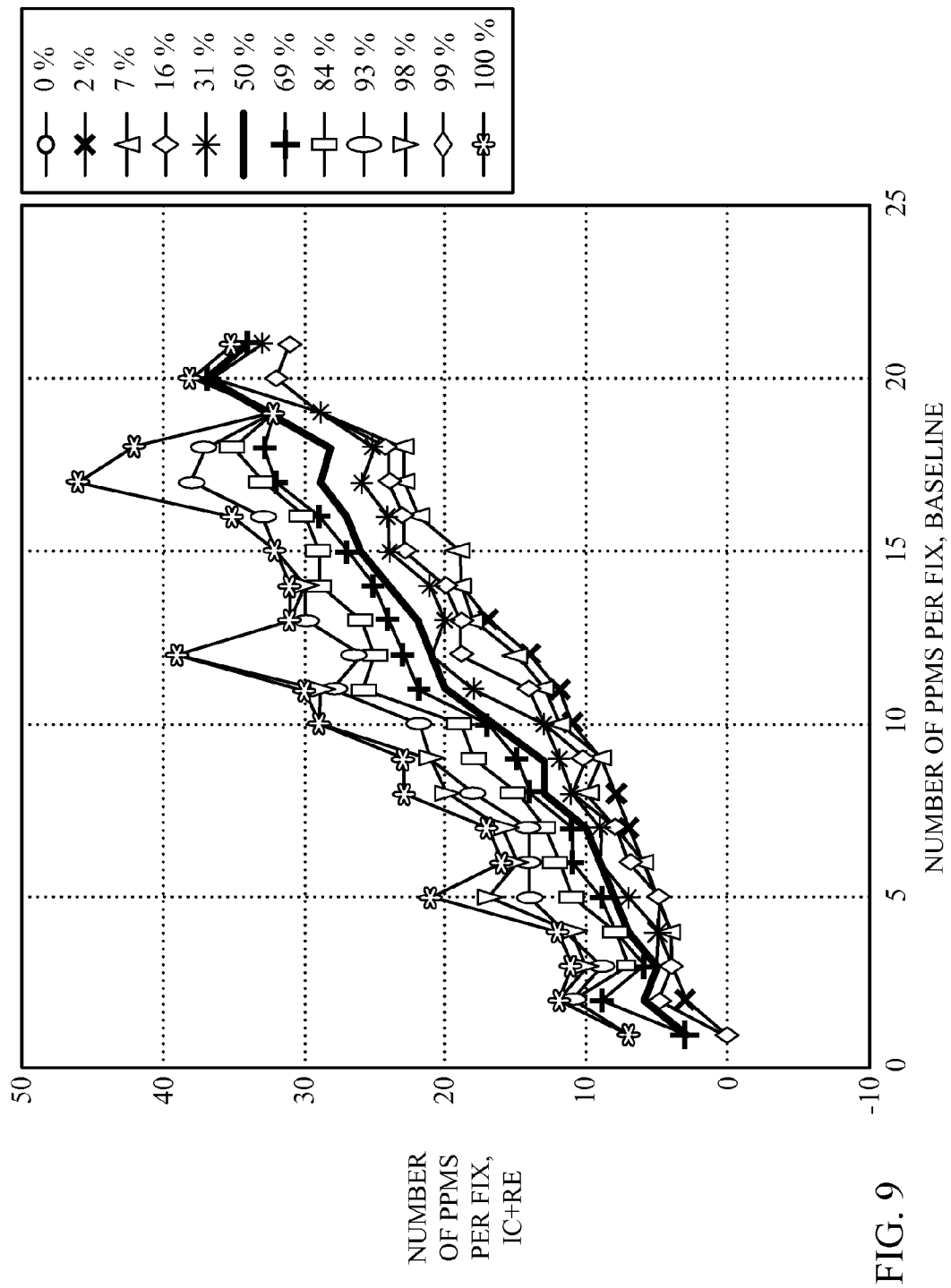
Figure 10:
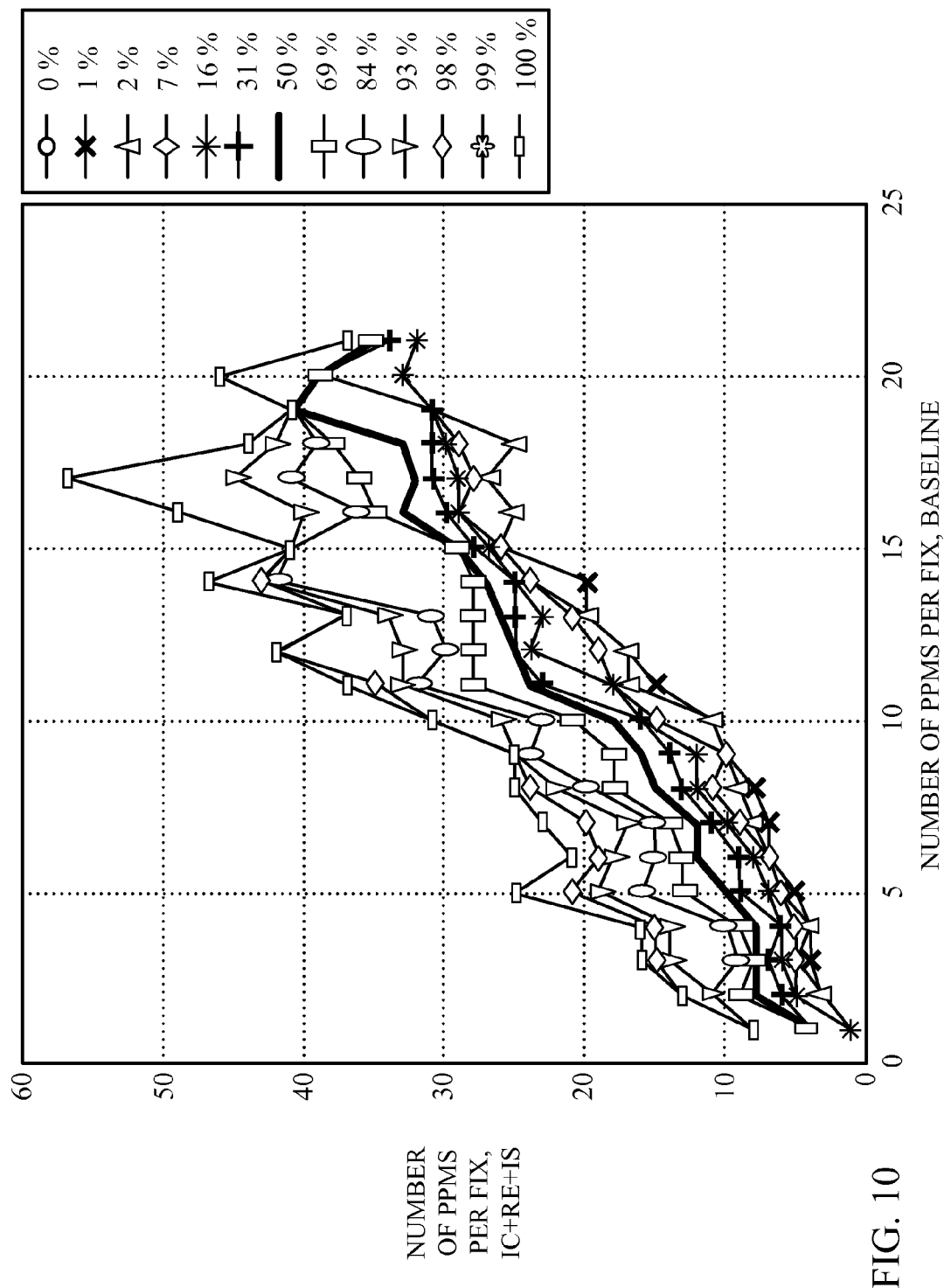

The improvement of number of PPMs per fix for fixes which start with a small number of PPMs is of interest since it has been shown that the largest improvements per additional PPM are gained when there are very few PPMs to start with. Cross-CDF plots are plots from which the CDF of one variable (for example the number of PPMs per fix under some improvement) can be plotted conditioned on the value of some other variable such as the number of PPMs per fix for the baseline format. FIGS. 7-10 compare the number of PPMs per fix for the RS, IS or IC algorithms alone or in various combinations with the number of PPMs per fix in the baseline format. As shown in FIG. 7, the IC algorithm adds the most improvement in PPMs per fix, even at low PPM count fixes. In FIG. 8, both IC and IS algorithms are applied. As shown in FIG. 8, there is a very significant increase in the number of PPMs per fix throughout the baseline fix. In FIG. 9, both IC and RE algorithms are applied. At low PPMs per fix, the improvement is about 2 to 3 PPMs, but the improvement increases at high PPMs per fix. In FIG. 10, IC, RE and IS algorithms are applied. As shown in FIG. 10, the median improvement is about 5 to 6 PPMs added to each fix with increased improvements at higher PPM count fixes. The 2 antenna Interference cancellation (IC) algorithm improves the low PPM count fixes by greater than 50%. When the IC algorithm is added in combination with the RE algorithm and IS algorithm, the improvement is 93% as shown in Table 5.

A second embodiment of interference cancellation algorithm uses simplified processing. Antenna weight components are selected based on the received measurement of the strongest navigation beacon signal on each antenna to exactly cancel the strongest navigation beacon signal. Given that $a_1$ and $a_2$ are the complex voltages of the strongest navigation beacon signal on each of two antennas (antenna #1 and antenna #2), then set the antenna weight components $w_1$ and $w_2$ to cancel the strongest navigation beacon signal such that $w_1 = -a_1$ and $w_2 = a_2$. Here, $w_1 * a_1 + w_2 * a_2$ equals zero, canceling out the strongest navigation beacon signal. In the case where there are multiple strong navigation beacon signals, set the complex antenna weight components to cancel as many of the multiple strong navigation beacon signals as feasible. In an example using three strong navigation beacon signals, suppose that the complex voltages of the three strong navigation beacon signals received by antenna #1 are $x_1$, $y_1$ and $z_1$ and the complex voltages of the three strong navigation beacon signals received by antenna #2 are $x_2$, $y_2$ and $z_2$. Given that the sum of complex voltages on antenna #1 is $S_1 = x_1 + y_1 + z_1$ and the sum of complex voltages on antenna #2 is $S_2 = x_2 + y_2 + z_2$, the antenna weight components $w_1$ and $w_2$ should be set to $w_1 = -S_2$ and $w_2 = S_1$ to cancel the three strong navigation beacon signals at a reasonable tradeoff so that other weaker navigation beacon signals will be detectable by the antennas.

Although a specific mathematical formula is shown in the example for calculating the antenna weight components, one skilled in the art would understand that other mathematical formulas may be used for the antenna weight components without violating the scope of the present invention. Additionally, one skilled in the art would know that the present invention is not limited to canceling only a specific number of strong navigation beacon signals. Rather, it would be known to one skilled in the art to apply the antenna weight components to the sum of complex voltages of a plurality of strong navigation beacon signals for canceling the desired number of strong navigation beacon signals.

Additionally, it is not necessary to have two physical antennas. A single antenna which captures its received measurements at different times as though they were two distinct measurements received by two separate antennas at the same time is known as a synthetic aperture antenna. A synthetic aperture antenna could be used with the interference cancellation algorithm for detecting navigation beacon signals that may be masked by stronger navigation beacon signals. In using a synthetic aperture antenna, suppose that there are two virtual antennas (virtual antenna #1 and virtual antenna #2) since the navigation beacon signals received by one physical antenna at different times are combined as if they were received at the same time. For example, virtual antenna #1 could consist of pilot bursts arriving between times $t_1$ and $t_1+d$ while virtual antenna #2 could consist of pilot bursts arriving a short time later—between times $t_3$ and $t_3+d$. Times $t_1$ and $t_3$ differ by an integer number of PN Rolls. Because the pilot bursts repeat themselves exactly once every PN Roll, the navigation beacon signals from two pilot bursts separated by an integer number of PN Rolls in time is similar to simultaneous navigation beacon signals received by two antennas separated in space. Once the two times $t_1$ and $t_3$ are defined, all the combining processing applicable to the two physical antenna case (as described earlier) can be applied.

Additionally, the use of "successive cancellation" using one physical antenna can be used with the interference cancellation algorithm for detecting navigation beacon signals. Here the receiver stores copies of navigation beacon signals. For navigation beacon signals the receiver sees very strongly, the receiver can treat the memorized navigation beacon signals as though they came from a second "virtual antenna," as long as the time-delay of the memorized navigation beacon signal is set to match the time-delay of the actually received strong navigation beacon signal to emulate spatial diversity. Then using either eigenvalue or simplified processing, the strong navigation beacon signal can be effectively removed, and weaker navigation beacon signals which was masked can then be seen. It would be understood by one skilled in the art that the use of this "successive cancellation" technique can be employed successively, removing the strongest navigation beacon signal, then the second strongest, then the third strongest, etc., until a desired level of sensitivity to weaker navigation beacon signals is achieved.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

What is claimed is:

1. A method for detecting a plurality of navigation beacon signals, the method comprising:

receiving, at a mobile receiver, a first navigation beacon signal measurement from a base station;

receiving, at the mobile receiver, a distinct second navigation beacon signal measurement from the base station; and combining the first navigation beacon signal measurement with the distinct second navigation beacon signal measurement based on two antenna weight components to form an interference cancellation beam.

2. The method of claim 1 wherein the two antenna weight components are determined by eigenvalue processing.

3. The method of claim 1 wherein the two antenna weight components are determined by simplified processing.

4. The method of claim 3 wherein each of the two antenna weight components comprises a complex voltage of a strongest navigation beacon signal.

5. The method of claim 3 wherein each of the two antenna weight components comprises the sum of complex voltages of a plurality of strongest navigation beacon signals.

6. The method of claim 1 wherein the first navigation beacon signal measurement is determined from a first signal received at a first antenna, and the distinct second navigation beacon signal measurement is determined from a distinct second signal received at a spatially diverse second antenna.

7. The method of claim 1 wherein the first navigation beacon signal measurement is determined from a first signal received at an antenna during a first time period, and the distinct second navigation beacon signal measurement is determined from a distinct second signal received at the antenna during a distinct second time period.

8. The method of claim 1 wherein the first navigation beacon signal measurement is determined from a copy of a previously received navigation beacon signal.

9. The method of claim 8 wherein the previously received navigation beacon signal comprises a previously received strongest navigation beacon signal.

10. The method of claim 1 wherein the first navigation beacon signal measurement comprises a base station pilot signal measurement.

11. A mobile wireless communication apparatus configured to detect a plurality of navigation beacon signals, the apparatus comprising:

an antenna system;

a transceiver system coupled to the antenna system and configured to receive, via the antenna system, a first navigation beacon signal measurement from a base station, and a distinct second navigation beacon signal measurement from the base station; and a processor configured to combine the first navigation beacon signal measurement with the distinct second navigation beacon signal measurement based on two antenna weight components to form an interference cancellation beam;

wherein the antenna system is contained within the mobile wireless communication apparatus.

12. The apparatus of claim 11, wherein the antenna system comprises:

a first antenna configured to provide a first navigation beacon signal to the transceiver system; and a spatially diverse second antenna configured to provide a second navigation beacon signal to the transceiver system.

13. The apparatus of claim 11, wherein the antenna system comprises a synthetic aperture antenna, and wherein the transceiver system is configured to receive, from the synthetic aperture antenna, the first navigation signal measurement at a time distinct from a time that the transceiver system receives the distinct second navigation beacon signal measurement.

14. The apparatus of claim 11, wherein the transceiver system is configured to receive, as the first navigation signal measurement, a pilot signal measurement from the base station.

15. The apparatus of claim 11, wherein the transceiver system comprises a mobile user transceiver system.

16. The apparatus of claim 11, wherein the processor is configured to determine the two antenna weight components based on eigenvalue processing.

17. The apparatus of claim 11, wherein the processor is configured to determine the two antenna weight components to cancel a strongest navigation beacon signal.

18. The apparatus of claim 11, wherein the processor is configured to determine a complex weight for each of the two antenna weight components.

19. An apparatus configured to detect a plurality of navigation beacon signals, the apparatus comprising:

means for receiving, at a mobile receiver, a first navigation beacon signal measurement from a base station;

means for receiving, at the mobile receiver, a distinct second navigation beacon signal measurement from the base station; and means for combining the first navigation beacon signal measurement with the distinct second navigation beacon signal measurement based on two antenna weight components to form an interference cancellation beam.

20. A computer readable medium in a mobile wireless communication device, the computer readable medium being encoded with computer executable instructions for:

determining a first antenna weight component;

determining a second antenna weight component; and combining a first navigation beacon signal measurement received from a base station with a distinct second navigation beacon signal measurement received from the base station based on the first and second antenna weight components to form an interference cancellation beam.

* * * * *